(12) United States Patent
Brock

(10) Patent No.: US 8,672,624 B2
(45) Date of Patent: Mar. 18, 2014

(54) HIGH EFFICIENCY WIND TURBINE HAVING INCREASED LAMINAR AIRFLOW

(75) Inventor: Gerald E. Brock, Livonia, NY (US)

(73) Assignee: SkyWolf Wind Turbine Corp., Geneseo, NY (US)

( * ) Notice: Subject to any disclaimer, the term of this patent is extended or adjusted under 35 U.S.C. 154(b) by 352 days.

(21) Appl. No.: 13/238,217

(22) Filed: Sep. 21, 2011

(65) Prior Publication Data

US 2012/0275919 A1 Nov. 1, 2012

Related U.S. Application Data

(63) Continuation-in-part of application No. 13/094,952, filed on Apr. 27, 2011.

(51) Int. Cl.
*F03D 1/04* (2006.01)

(52) U.S. Cl.
USPC ......... 415/220; 415/108; 415/211.2; 415/4.3; 415/4.5

(58) Field of Classification Search
USPC ................. 415/108, 191, 211.2, 220, 4.3, 4.5
See application file for complete search history.

(56) References Cited

U.S. PATENT DOCUMENTS

| | | | |
|---|---|---|---|
| 4,075,500 A | 2/1978 | Oman | |
| 4,147,472 A * | 4/1979 | Kling | 416/193 R |
| 4,204,799 A | 5/1980 | de Geus | |
| 4,324,985 A | 4/1982 | Oman | |
| 4,482,290 A * | 11/1984 | Foreman et al. | 415/207 |
| 6,655,907 B2 | 12/2003 | Brock et al. | |
| 6,887,031 B1 | 5/2005 | Tocher | |
| 7,218,011 B2 | 5/2007 | Hiel et al. | |
| D608,736 S | 1/2010 | Brock | |
| 8,376,686 B2 * | 2/2013 | Presz et al. | 415/1 |
| 2003/0133783 A1 | 7/2003 | Brock et al. | |
| 2005/0285407 A1 | 12/2005 | Davis et al. | |
| 2009/0180869 A1 | 7/2009 | Brock | |
| 2009/0280008 A1 | 11/2009 | Brock | |
| 2009/0280009 A1 | 11/2009 | Brock | |
| 2010/0086393 A1 | 4/2010 | Presz, Jr. et al. | |
| 2010/0284802 A1 | 11/2010 | Presz, Jr. et al. | |
| 2010/0316487 A1 | 12/2010 | Presz, Jr. | |
| 2010/0316493 A1 | 12/2010 | Presz, Jr. et al. | |
| 2010/0320760 A1 | 12/2010 | Yu et al. | |
| 2011/0008164 A1 | 1/2011 | Presz, Jr. | |
| 2011/0085901 A1 * | 4/2011 | Presz et al. | 415/208.1 |

FOREIGN PATENT DOCUMENTS

| | | |
|---|---|---|
| DE | 10036307 A1 | 2/2002 |
| WO | 2010028342 A2 | 3/2010 |
| WO | 2010036216 A1 | 4/2010 |
| WO | 2011008720 A2 | 1/2011 |
| WO | 2011094569 A1 | 8/2011 |

* cited by examiner

*Primary Examiner* — Ninh H Nguyen
(74) *Attorney, Agent, or Firm* — Harris Beach PLLC; Neal L. Slifkin

(57) ABSTRACT

A wind turbine is provided with turbine blades mounted for axial rotation about an axis. The blades are surrounded by a shroud to define an axial air passage. A conical ring is attached to the shroud and includes vanes for directing the airflow. Plates are attached to the shroud at a position radially outward from the shroud forming an air passage between the shroud and the plates. The plates have gaps between the adjacent plates so that air exiting the downstream opening of the shroud and air moving through the axial air passage between the shroud and the plates are mixed and a portion of the mixed air exits through the gaps.

34 Claims, 18 Drawing Sheets

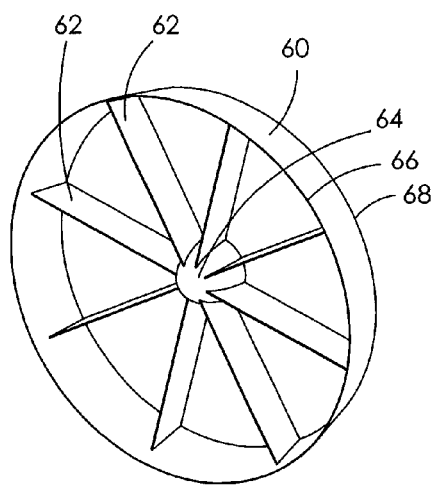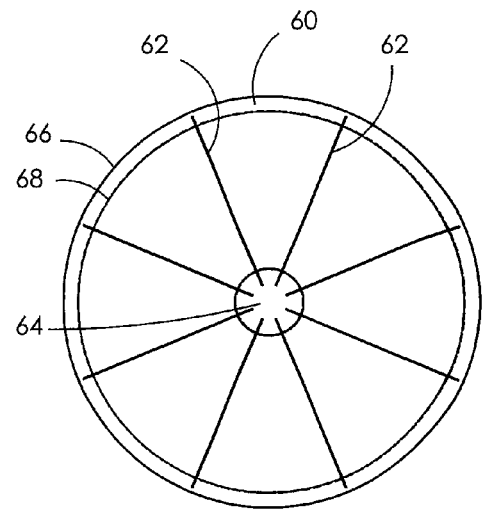
FIG. 16  FIG. 17
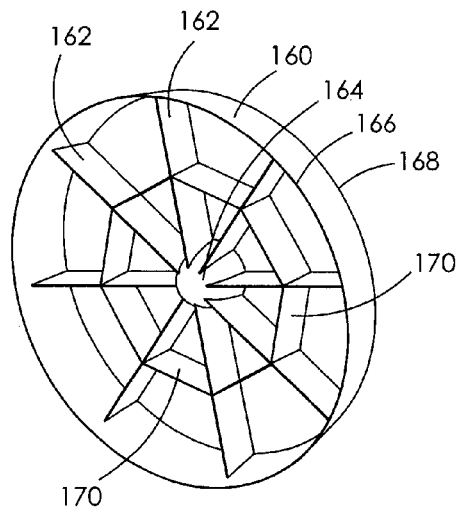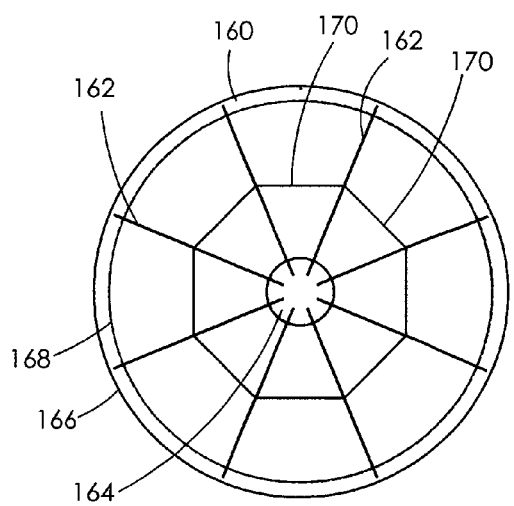
FIG. 18  FIG. 19

HIGH EFFICIENCY WIND TURBINE HAVING INCREASED LAMINAR AIRFLOW

CROSS-REFERENCE TO RELATED APPLICATIONS

The present application is a Continuation-in-Part of a pending U.S. patent application Ser. No. 13/094,952, filed Apr. 27, 2011.

FIELD OF THE INVENTION

The present invention relates to wind turbines. More particularly, the present invention relates to high efficiency wind turbines for extracting energy from the wind.

BACKGROUND OF THE INVENTION

Wind energy has been used for centuries for a variety of useful purposes including grinding grain and pumping water. Recently, there has been extensive research and development worldwide in technology to use wind to generate electricity. Generating electricity from wind power does not result in the emission of carbon dioxide, hydrocarbons, carbon monoxide, particulates or other harmful compounds. Wind energy is, therefore, an attractive alternative to at least a portion of the power generated by burning fossil fuels in conventional power plants. The use of wind energy also reduces the need for coal mining which can be hazardous to miners and harmful to the environment.

There has been a continuing need and desire for improvements in wind driven power generators, including the desire to overcome the shortcomings of conventional power generators while also providing a generator which is efficient and physically compact. This increasingly competitive source of energy is steadily providing a growing share of worldwide electricity. Significant numbers of these wind turbines have been located in particular areas with high average wind speeds to form wind farms with considerable generating capability. Wind turbines have also been used to generate electricity in off-grid applications such as remote sites.

Traditional wind turbines are typically mounted on tall towers. The towers are often placed in open fields or along a ridgeline. In,addition to accessing higher wind speeds, the height of traditional wind turbines reduces or avoids risk to people, livestock, and wildlife that may be on or near the ground. But towers are expensive to build and, at least in some cases, their height may be objectionable, for example, for obstructing a view. Property owners in the vicinity of these wind turbines also have been known to object to the noise caused by the large rotating blades. Many of these traditional wind turbines have blades over 40 meters long, meaning the diameter of the rotor is over 80 meters, mounted on towers 80 meters tall. Land for the wind farm has to be purchased or leased, and transmission line easements have to be obtained from the wind farm to the existing transmission power grid. As a result, the development time is long and costs are very high. Because of these restrictions, many new wind farms cannot be built for several years.

Thus, because of the problems associated with such traditional wind farms, much current research has been devoted to smaller wind turbines. While it is possible to create turbines with a wide range of blade lengths, much recent development has been devoted to turbines with smaller blade lengths than those found in traditional wind turbines. These smaller turbines can be mounted on the roofs of buildings or on poles, which are only a fraction of the height of traditional wind turbine towers. However, typical small wind driven turbines are relatively inefficient, often only converting a small fraction of the wind's kinetic energy into usable electrical power. When these smaller wind turbines have the blades mounted within a housing, or shroud, the designs allow for greater power extraction out of the wind, compared to prior art open designs. Examples of such wind turbines are found in U.S. Pat. Nos. 7,218,011, 4,204,799, 4,075,500, 6,655,907 and 6,887,031, the disclosures of which are hereby incorporated by reference herein. These smaller scale wind turbines may be mounted on lower poles, such as at a height of 10 meters, or may be mounted on the top of buildings. Thus, the smaller turbines are less expensive to build, and create less of an impact on the environment compared to the traditional larger turbines. A small scale wind turbine is needed which is highly efficient and which retains the other advantages of wind power generation.

BRIEF SUMMARY OF THE INVENTION

A wind turbine is provided for extracting energy out of an airflow. The wind turbine includes a plurality of turbine blades mounted for rotation about a longitudinal axis. For example, the blades could be mounted to a rotating hub. In some embodiments, the turbine could have between 3 and 20 blades. Preferably, the blades have a length which will extend almost all the way to the shroud which surrounds the blades. The shroud, preferably constructed from steel or aluminum, surrounds the turbine blades. The shroud could be cylindrical, conical, square or other suitable shapes. The shroud has an upstream opening and a downstream opening. A plurality of plates are attached to the shroud and can be spaced radially outward from the shroud or can be mounted on the surface of the shroud. The plates are constructed from any suitable material such as steel, aluminum, or other materials known to those of skill in the art. The plates could be attached at various positions along the axis of the shroud, such as near the upstream opening, near the downstream opening, or at a midpoint between the two. The plates are spaced around the circumference of the shroud and project beyond the downstream opening of the shroud. The plates could be planar or arcuate, and could have a constant width, or a width which varies along the longitudinal direction. The plates could have a curvature generally corresponding to,the shroud. The plurality of plates form a second discontinuous shroud. The shroud and the plurality of plates form a second axial air passage between them. Because the plates form a discontinuous shroud, there are gaps between adjacent plates such that air exiting the downstream opening of the shroud and air moving through the axial air passage between the shroud and plates is mixed and a portion of the mixed air exits through the gaps. The ratio of the total area of the plates to the total area of the gaps is between 8:1 and 1:1, and is preferably 3:1. The plates can be tiled away from the axis of rotation of the blades from 0 degrees to 40 degrees. The plates allow for the wind turbine to turn about its mount so that the axis of rotation is aligned with the wind direction. The gaps in the plates cannot be so large as to prevent this alignment.

The wind turbine can also include a ring mounted near the downstream opening of the plates and spaced radially outward from the plates to create a third axial air passage between the ring and the plates.

To further improve the efficiency of the turbine, a conical ring can be attached in the upstream opening of the shroud. The conical ring is preferably made from steel, aluminum or other suitable material. The conical ring has an upstream edge defining an upstream area, and a downstream edge defining a downstream area. The length of the conical ring may vary depending on the size of the shroud to which it is attached. The upstream area is larger than the downstream area. The degree of taper of the conical ring from the upstream edge to the downstream edge and the thickness of the conical ring may vary, but the conical ring should be designed such that it does not introduce turbulence into the airflow. The conical ring causes increased airflow through the turbine by capturing more air and directing it through the turbine. The diameter of turbine blades defines a swept area. The downstream area of the conical ring is larger than the swept area of the blades. The conical ring includes a plurality of vanes between the upstream area and the downstream area. The vanes are generally perpendicular to the swept area of the blades. The vanes reduce turbulence in the airflow and increase the energy transferred from the airflow to the turbine blades.

BRIEF DESCRIPTION OF THE SEVERAL VIEWS OF THE DRAWINGS

Embodiments and applications of the invention are illustrated by the attached non-limiting drawings. The attached drawings are for purposes of illustrating the concepts of the invention and may not be to scale.

FIG. 16 is a perspective view of a conical ring of the present invention;

FIG. 17 is a front elevation view of the conical ring of FIG. 16;

FIG. 18 is a perspective view of another embodiment of a conical ring of the present invention;

FIG. 19 is a front elevation view of the conical ring of FIG. 18;

DETAILED DESCRIPTION OF THE INVENTION

Figure 1:
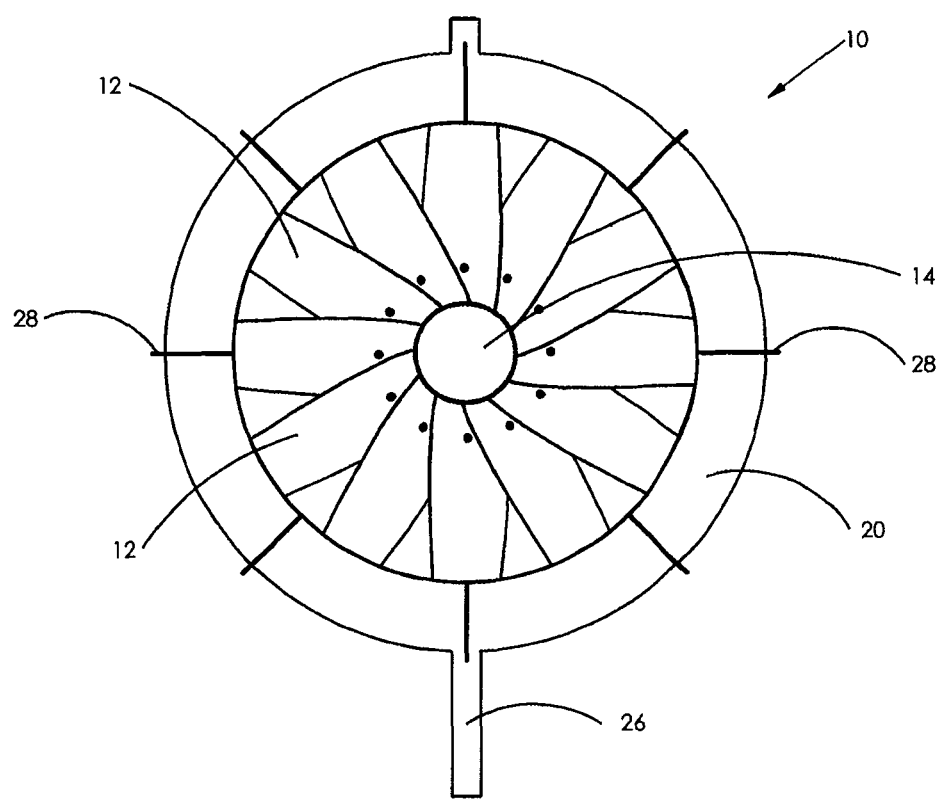
FIG. 1 is a front elevation view of the a conical shroud and turbine blades in accordance with one embodiment of the present invention.
Figure 2:
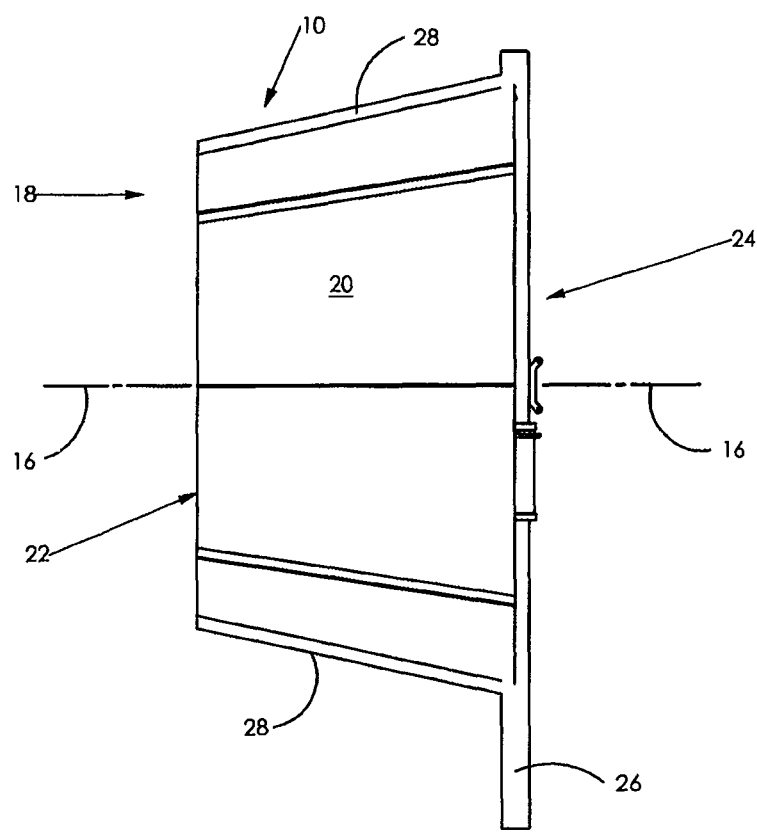
FIG. 2 is a side view of the shroud and turbine blades of FIG. 1.
Figure 3:
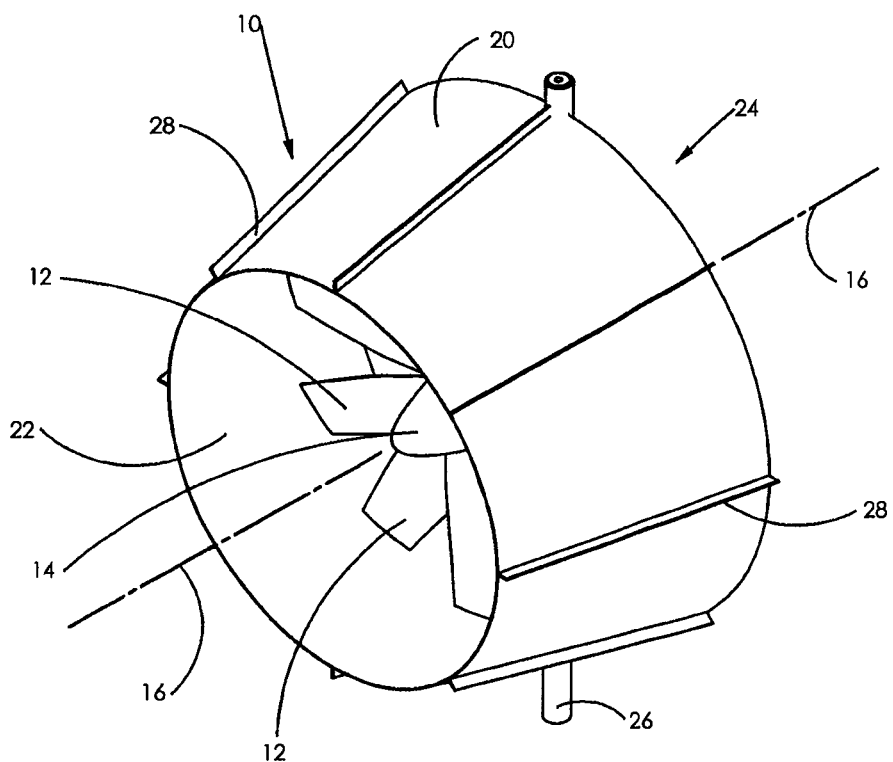
FIG. 3 is a perspective view of the shroud and turbine blades of FIG. 1.

The foregoing and other objects, features, and advantages of the invention will be apparent from the following more particular description of the embodiments of the invention. Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded in an illustrative, rather than a restrictive, sense. FIGS. 1 through 21 show the various embodiments of the invention. As best seen in FIGS. 1 through 3, the present invention includes a wind turbine 10 with a plurality of blades 12 arranged around a hub 14. The blades 12 are capable of rotation about the longitudinal axis 16. Surrounding the blades 12 is a shroud 20. The shroud 20 is shown as conical in shape, but may be any one of many suitable shapes. The conical shroud 20 includes an upstream opening 22 and a downstream opening 24. A post 26 is provided to mount the wind turbine 10 to a structure or above the ground. The conical shroud 20 has fins 28 which assist in aligning the longitudinal axis 16 with the direction of the wind 18.

Figure 4:
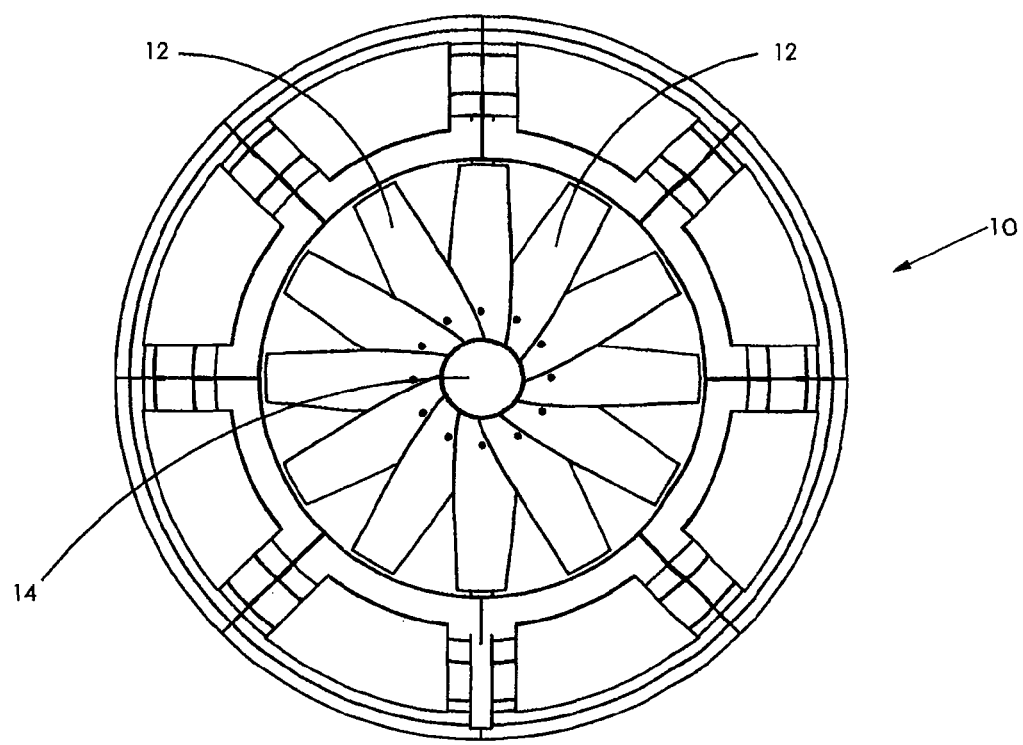
FIG. 4 is a front view of the shroud, turbine blades and plates in accordance with one embodiment of the present invention.
Figure 5:
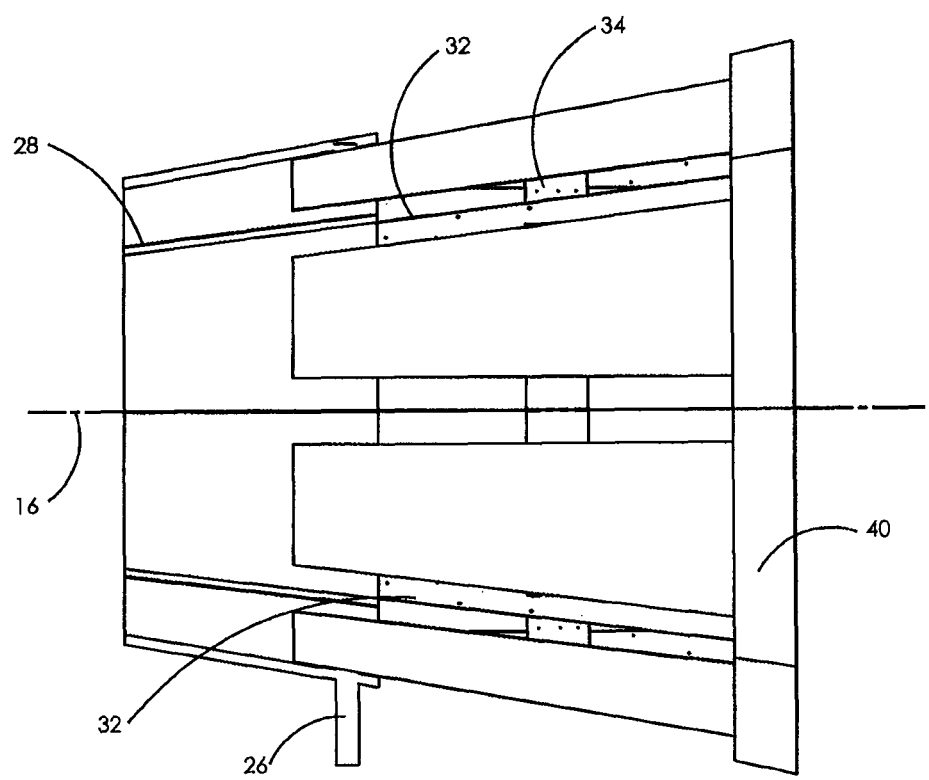
FIG. 5 is a side view of the shroud, turbine blades and plates of FIG. 4.
Figure 6:
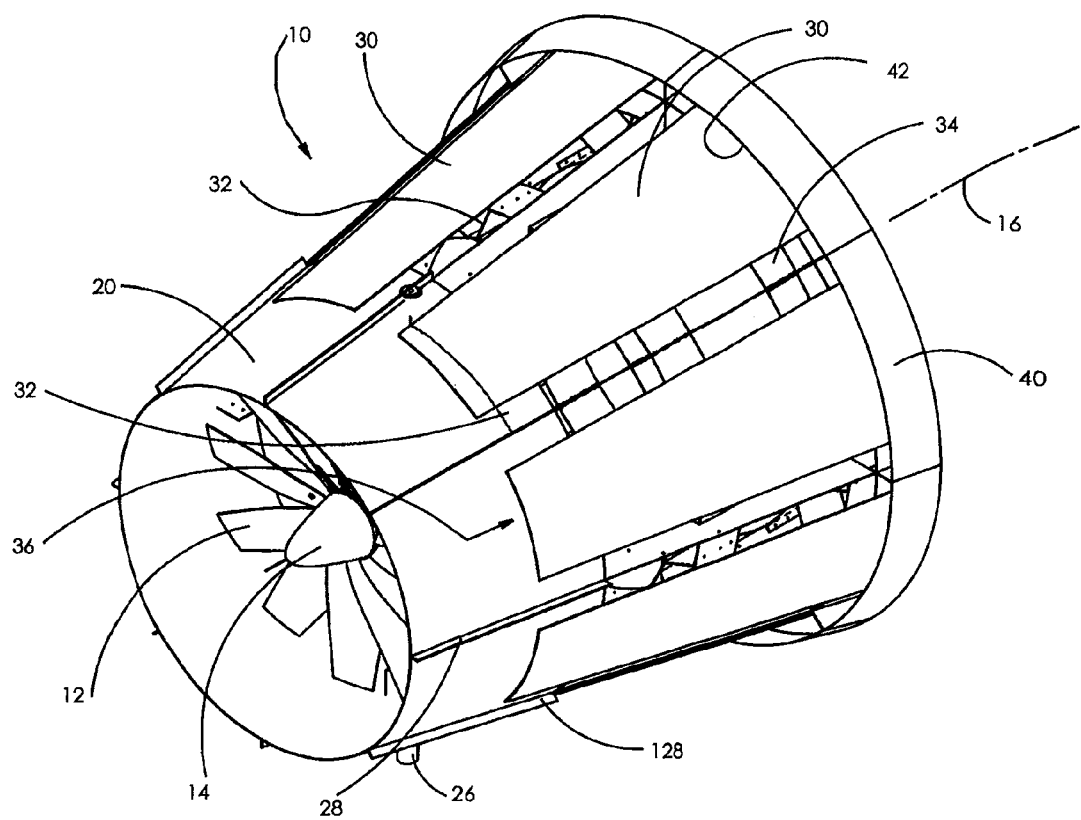
FIG. 6 is a perspective view of the shroud, turbine blades and plates of FIG. 3.
Figure 7:
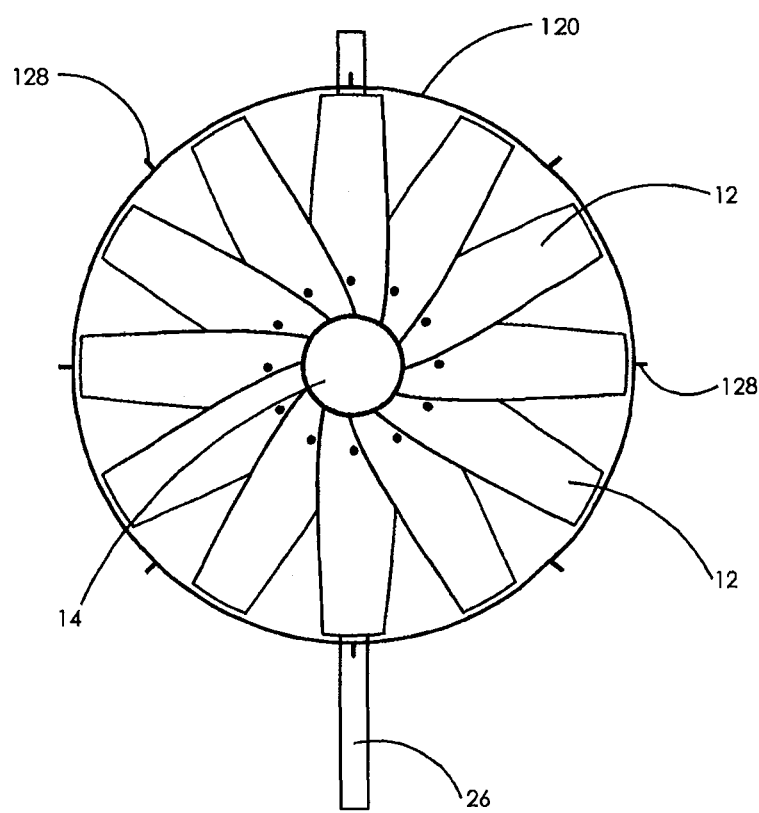
FIG. 7 is a front elevation view of the a cylindrical shroud and turbine blades in accordance with another embodiment of the present invention.
Figure 8:
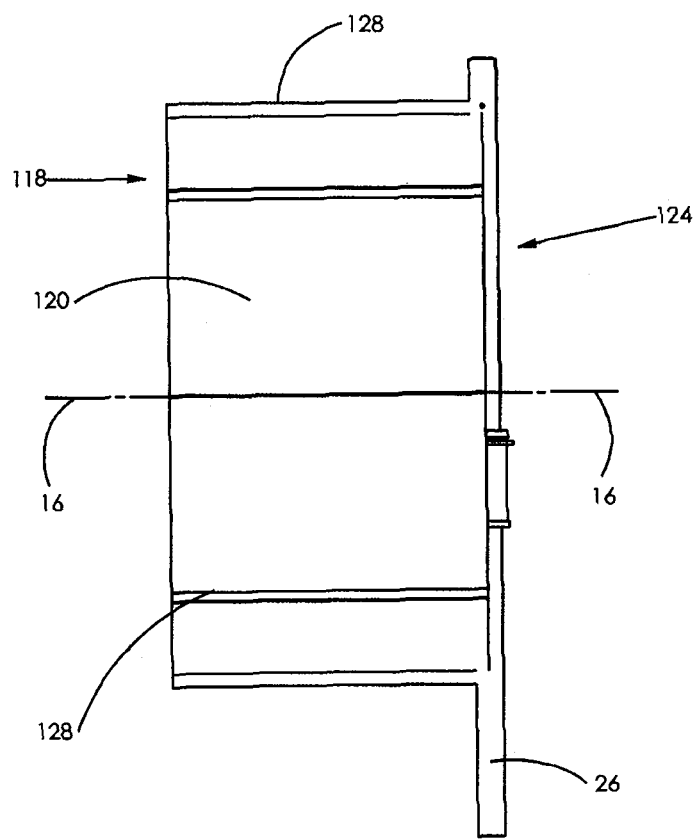
FIG. 8 is a side view of the shroud and turbine blades of FIG. 7.
Figure 9:
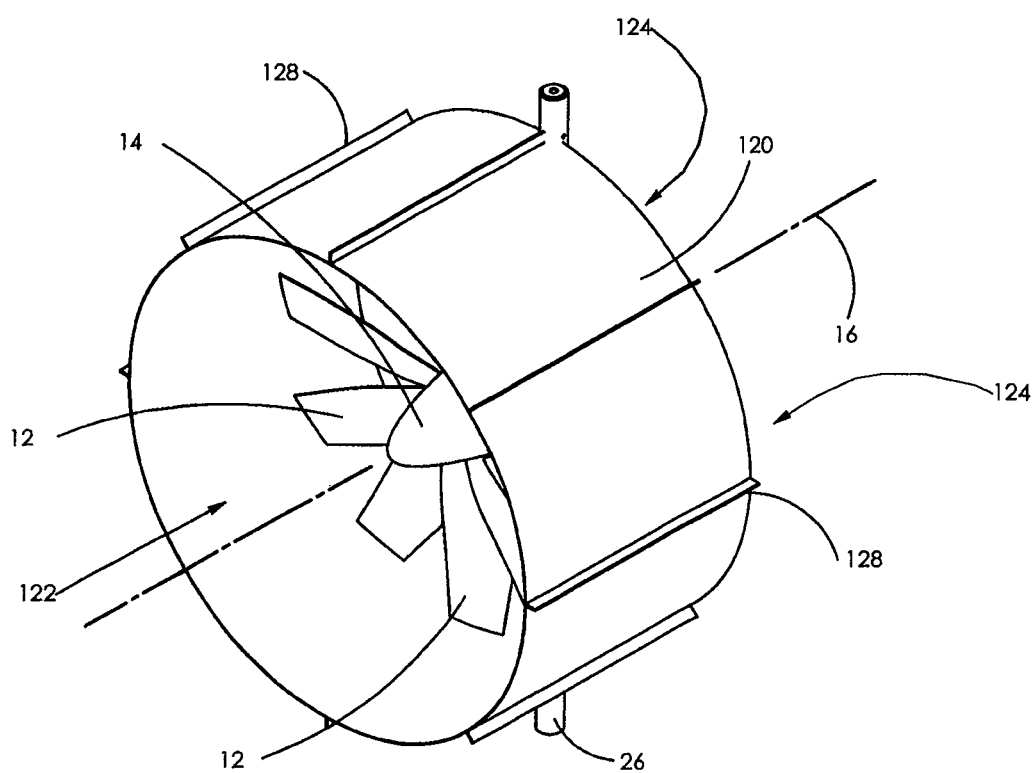
FIG. 9 is a perspective view of the shroud and turbine blades of FIG. 7.

Turning to FIGS. 4 through 6, plates 30 are mounted above the conical shroud 20. The plates 30 have gaps 32 between them. The plates 30 are mounted on a mounting structure 34 such that they are mounted to the surface of the conical shroud 20. The plates 30 project past the downstream opening 24 (FIG. 2) of the conical shroud 20. As air moves through the upstream opening 22 of the conical shroud, past the blades 12, it exits through the downstream opening 24 of the conical shroud 20. The function of blades 12 is accentuated by the downwind shroud 20 which serves to reduce pressure which increases the velocity of the air downwind of blades 12. A portion of the air exits through the gap 32. This configuration reduces the downstream air pressure and increases the efficiency of the wind turbine 10.

Optionally, an additional ring 40 is provided to create yet another moving airstream in the passage 42 between the plates 30 and the ring 40. This air stream further reduces the pressure at the downstream opening 24 (FIG. 2) of the conical shroud 20.

Figure 10:
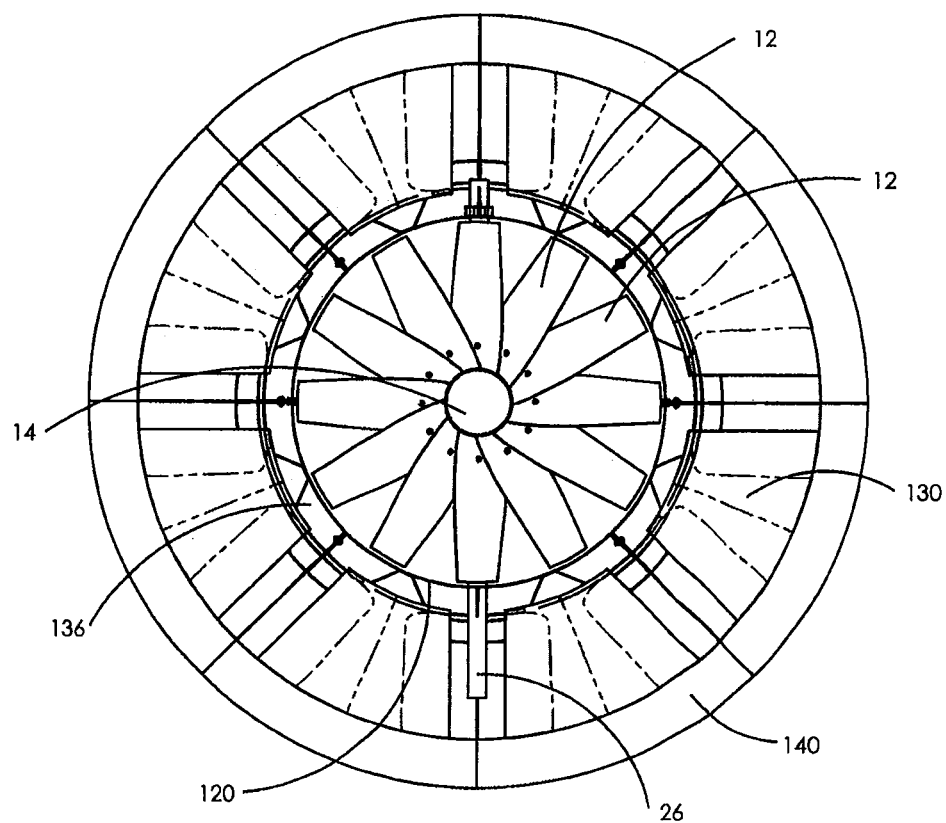
FIG. 10 is a front view of the shroud, turbine blades and plates in accordance with another embodiment of the present invention.
Figure 11:
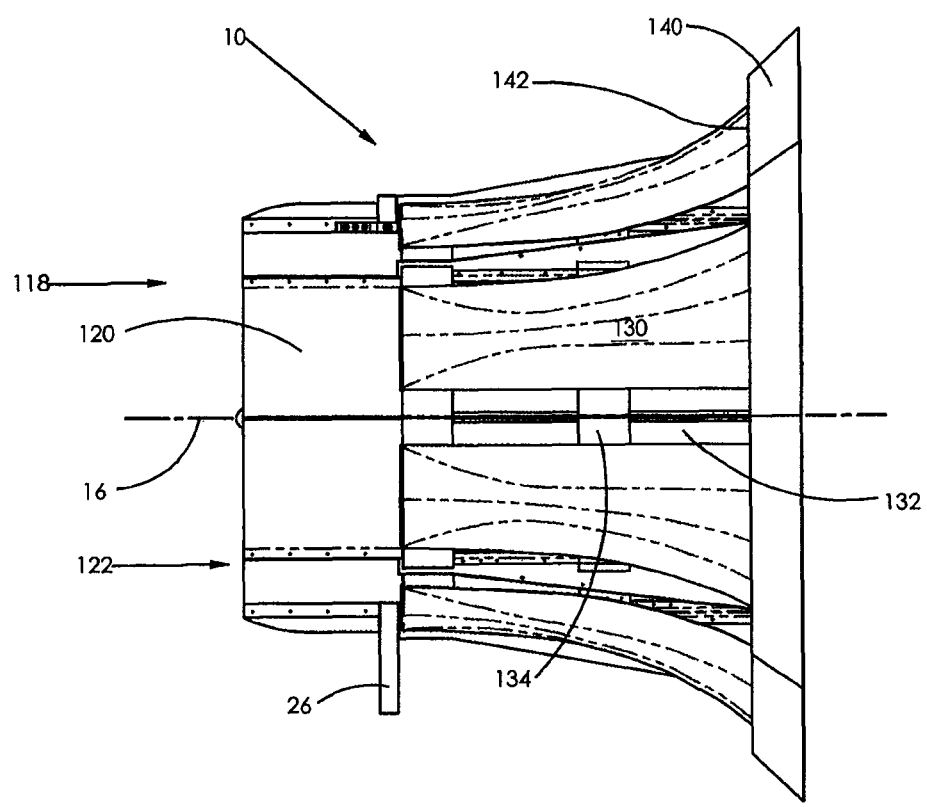
FIG. 11 is a side view of the shroud, turbine blades and plates of FIG. 10.
Figure 12:
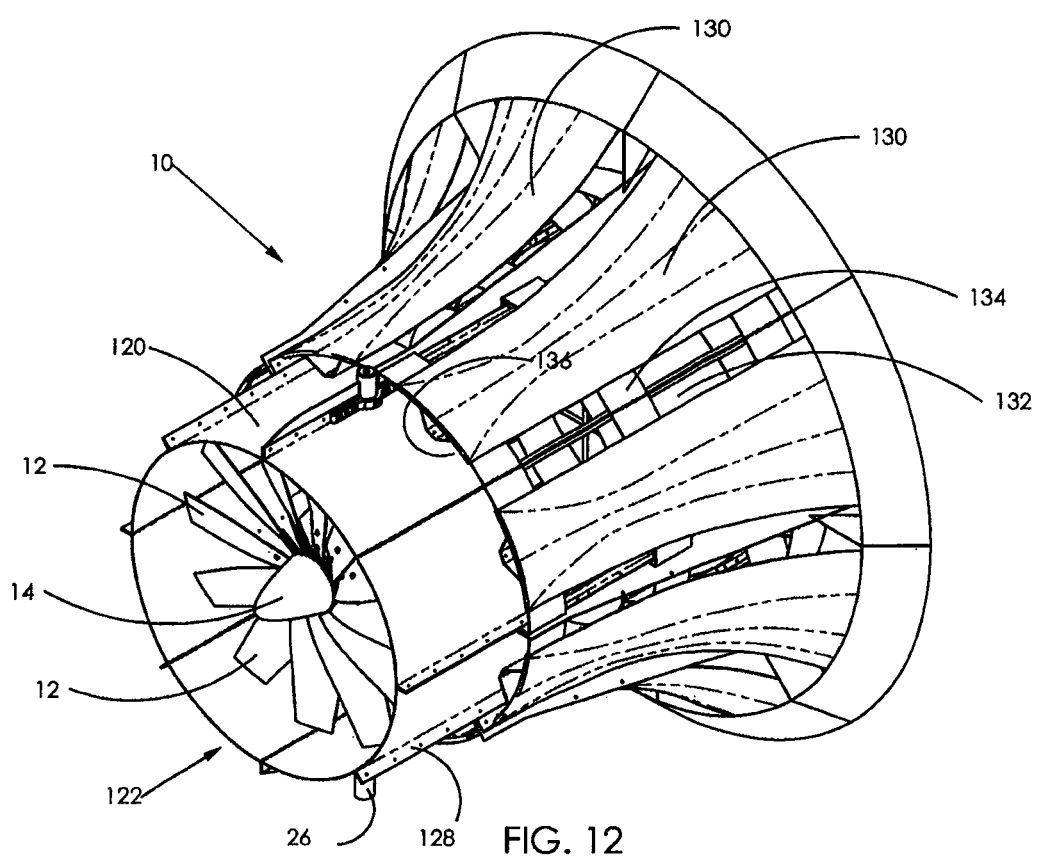
FIG. 12 is a perspective view of the shroud, turbine blades and plates of FIG. 10.

As shown in FIGS. 7 through 12, a cylindrical shroud 120 is shown, in place of the conical shroud 20 (FIG. 3). The cylindrical shroud 120 has fins 128 which assist in aligning the longitudinal axis 16 with the direction of the wind 118. The plates 130 are shown as arcuate instead of the planar plates 30 of FIG. 6. It will be understood by those of skill in the art that various configurations of the plates 30 and 130 can be used with the different embodiments of the invention disclosed herein. Turning to FIGS. 10-12, plates 130 are mounted above the cylindrical shroud 120. The plates 130 have fins 128 which assist in aligning the longitudinal axis 16 with the direction of the wind 118. The plates 130 have gaps 132 between them. The plates 130 are mounted on a mounting structure 134 such that they are raised off the surface of the cylindrical shroud 120. The plates 130 project past the downstream opening 124 of the cylindrical shroud 120. As air moves through the upstream opening 122 of the shroud, past the blades 12, it exits through the downstream opening 124 of the cylindrical shroud 120. Air also moves in the passage 136 underneath the plates 130. The air moving through the passage 136 mixes with the air exiting the downstream opening 124 (FIG. 9) of the shroud 120. A portion of that air exits through the gap 132. This configuration reduces the downstream air pressure and increases the efficiency of the wind turbine 10.

Optionally, an additional ring 140 is provided to create yet another moving airstream in the gap 142 between the plates 130 and the ring 140. This third air stream further reduces the pressure at the downstream opening 124 of the cylindrical shroud 120.

Figure 13:
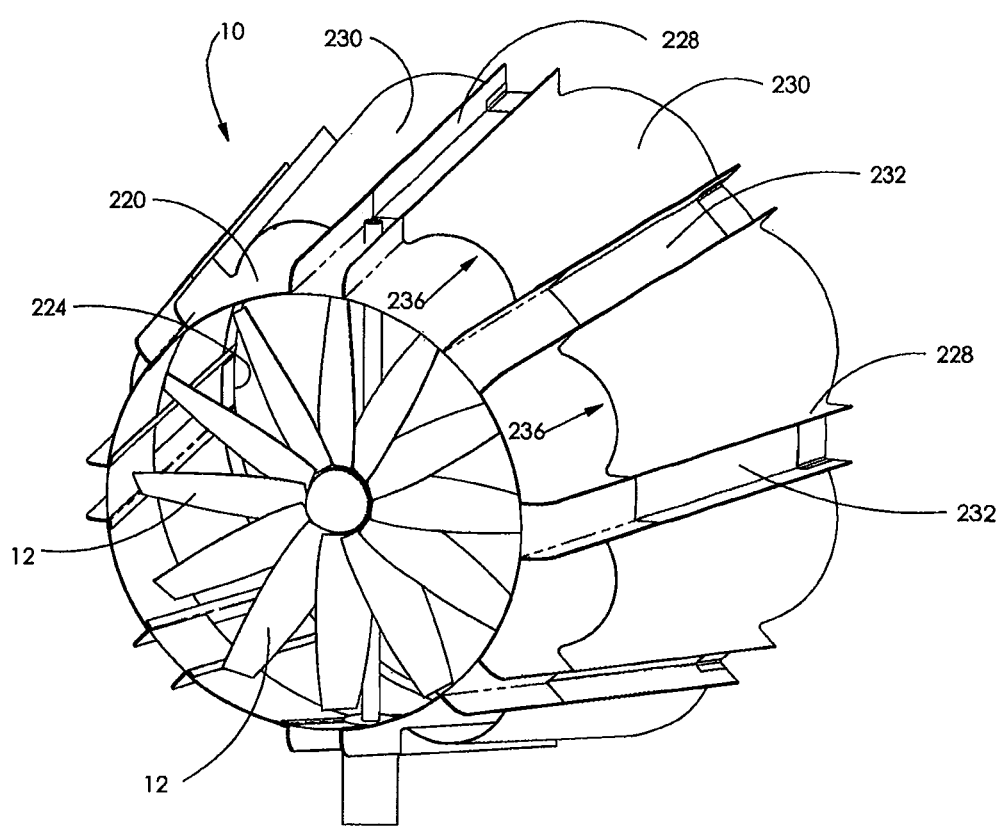
FIG. 13 is a perspective view of another embodiment of the present invention.

Turning to FIG. 13, a shroud 220 has curved plates 230 attached thereto. Fins 228 are between the curved plates 230. Between the plates 230 are also gaps 232 near the downstream end 224 of the shroud 220. Between the shroud 220 and the curved plates 230 are passages 236. These passages 236 are isolated from one another and from gaps 232. As air moves through the upstream opening 222 of the shroud 220, past the blades 12, it exits through the downstream opening 224 of the cylindrical shroud 220. Air also moves in the passage 236 underneath the plates 230. The air moving through the passage 236 mixes with the air exiting the downstream opening 224 of the shroud 220. A portion of that air exits through the gap 232. This configuration reduces the downstream air pressure and increases the efficiency of the wind turbine 10.

Figure 14:
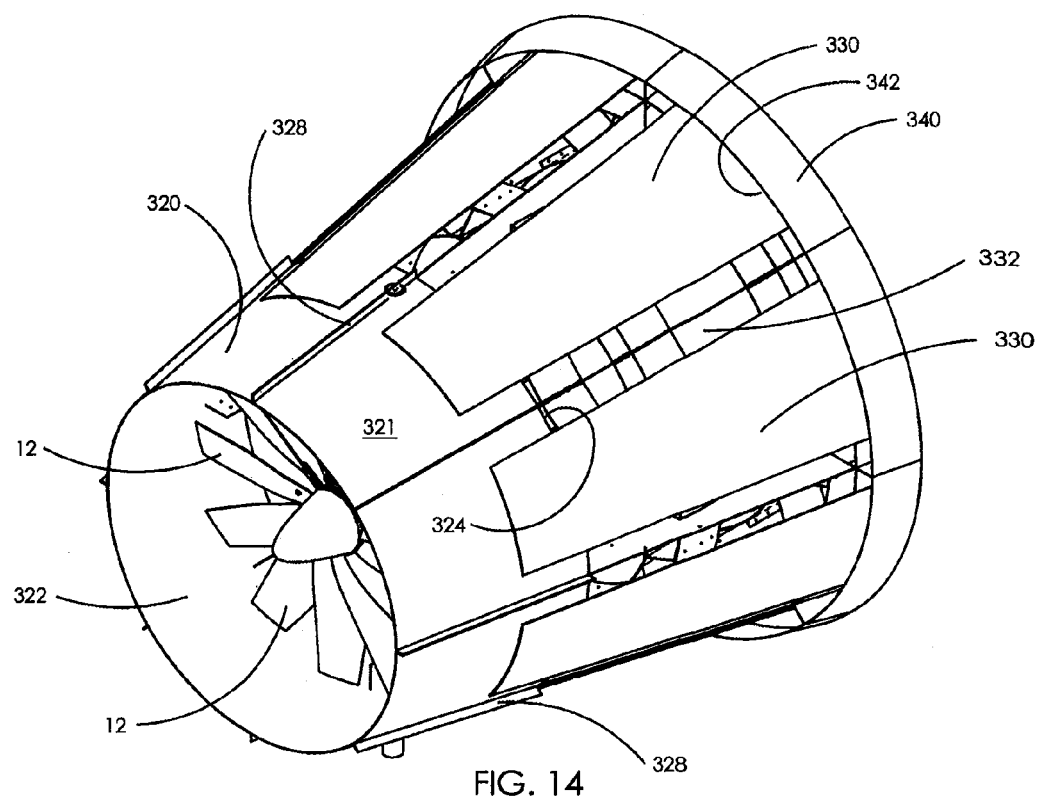
FIG. 14 is a perspective view of another embodiment of the present invention.

FIG. 14 shows another embodiment of the invention. A shroud 320 has plates 330 attached to the surface 321 of the shroud 320. Fins 328 are between the plates 330. Optionally, a ring 340 is provided to create a moving airstream through gap 342 downwind of the opening 324. This airstream reduces the pressure at the downstream opening 324 of the shroud 320. Between the plates 330 are gaps 332 near the downstream end 324 of the shroud 320. As air moves through the upstream opening 322 of the shroud 320, past the blades 12, it exits through the downstream opening 324 of the cylindrical shroud 320. A portion of that air exits through gaps 332, reducing the pressure at the downstream opening 324.

Figure 15:
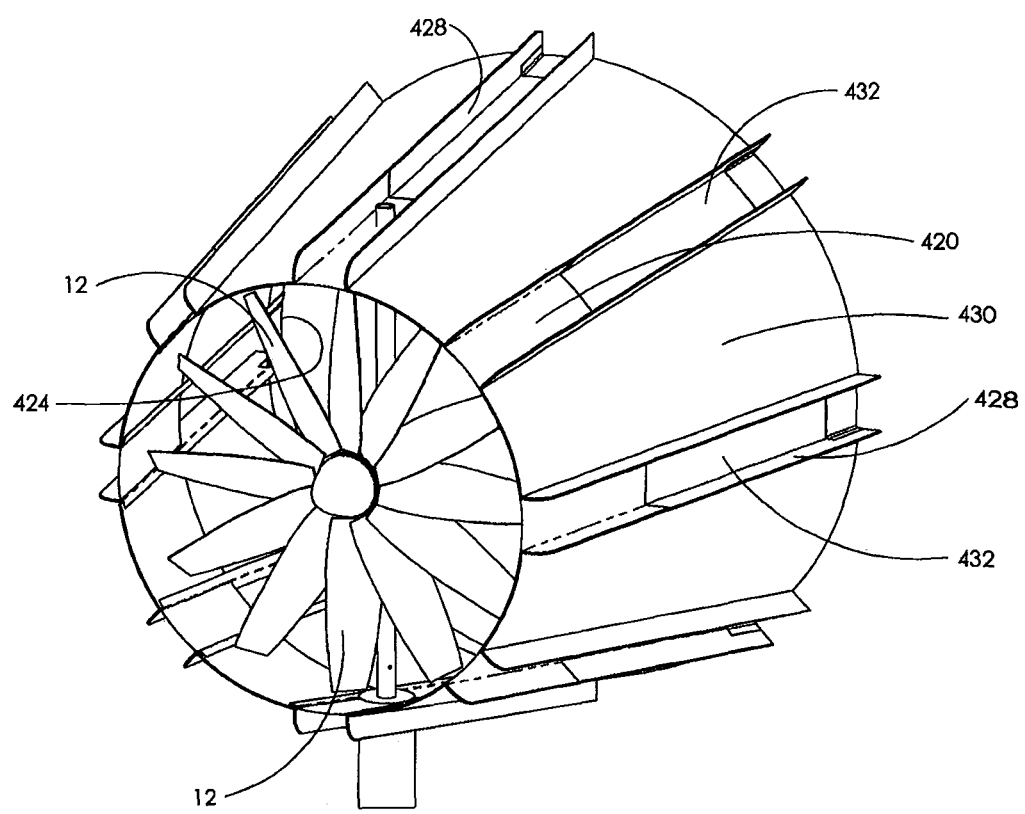
FIG. 15 is a perspective view of another embodiment of the present invention.

FIG. 15 shows another embodiment of the invention. A shroud 420 has fins 428 spaced about the circumference. The fins 428, as described above, assist in aligning the shroud 420 with the airflow. Plates 430 are mounted on the shroud 420. Gaps 432 are provided between the plates 430 to allow a portion of the airflow exiting past the blades 12 and the downstream opening 424 to exit through the gaps 432 reducing the pressure at the downstream opening 424.

Figure 20:
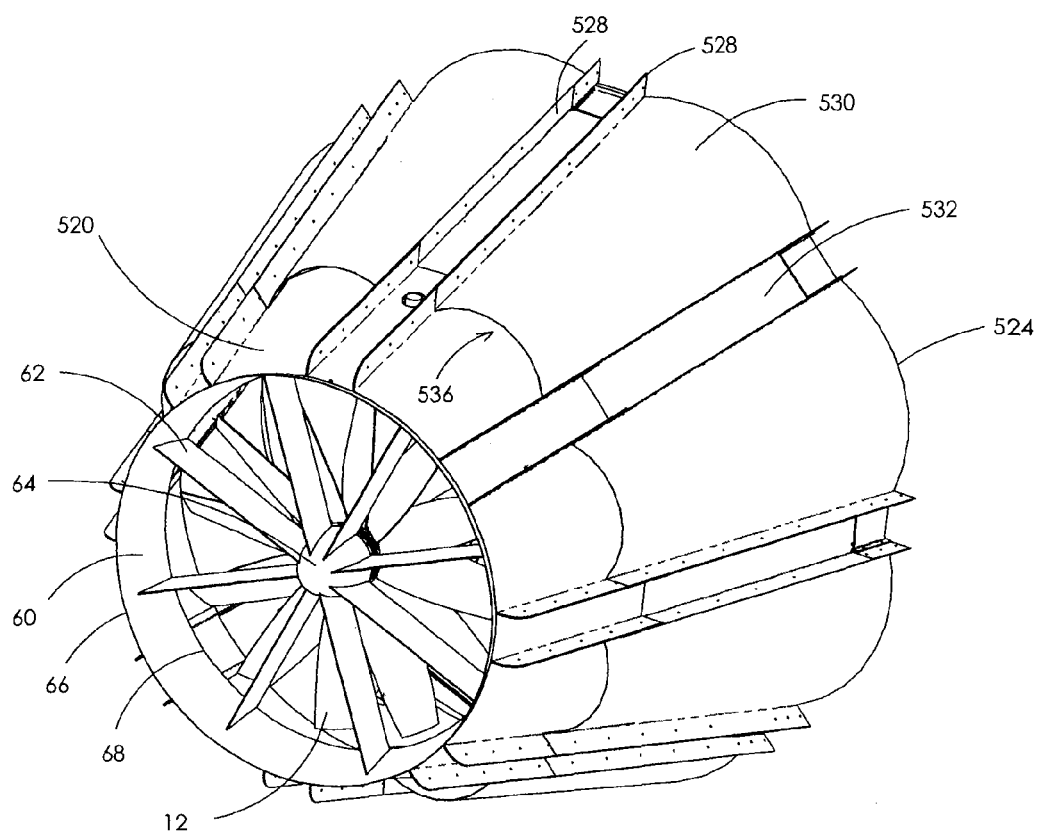
FIG. 20 is a perspective view of another embodiment of the present invention.

Another embodiment of the invention is shown in FIGS. 16-21. In FIGS. 16 and 17, a conical ring 60 is shown with radial vanes 62 extending from a hub 64. The conical ring 60 captures airflow within the area defined by its upstream edge 66 and concentrates that airflow as it passes through the area defined by the downstream edge 68. As shown in FIG. 20, a shroud 520 surrounds the blades 12. The conical ring 60 is attached to the shroud 520 by means known in the art such as screws, bolts, rivets, welding or other means. Fins 528 are between the curved plates 530. Between the plates 530 are also gaps 532 near the downstream end 524 of the shroud 520. Between the shroud 520 and the curved plates 530 are passages 536. These passages 536 are isolated from one another and from gaps 532. Air moves through the shroud 520, past the blades 12, and it exits through the downstream opening 524 of the shroud 520.

FIGS. 18 and 19 show another embodiment. The conical ring 160 has radial vanes 162 surrounding a hub 164. Circumferential vanes 170 are also provided. The conical ring 160 captures airflow within the area defined by its upstream edge 166 and concentrates that airflow as it passes through the area defined by the downstream edge 168.

Figure 21:
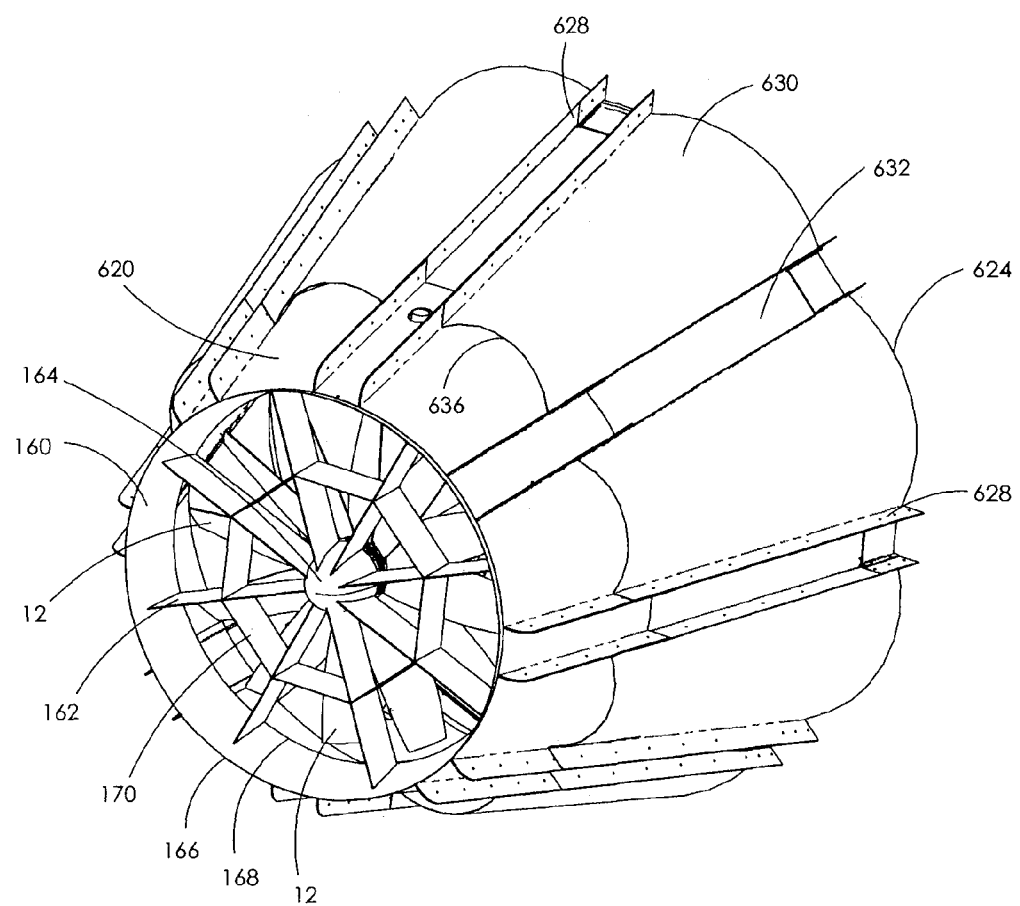
FIG. 21 is a perspective view of another embodiment of the present invention.

FIG. 21 shows the ring 60 attached to a shroud 620. The conical ring 160 is attached to the shroud 620 by means known in the art such as screws, bolts, rivets, welding or other means. The blades 12 have a swept area which is inside of the edge 168. The vanes 162 make the air less turbulent and provide for more efficient transfer of energy from the air to the blades 12. As with other embodiments, a shroud 620 surrounds the blades 12. Fins 628 are between the curved plates 630. Between the plates 630 are also gaps 632 near the downstream end 624 of the shroud 620. Between the shroud 620 and the curved plates 630 are passages 636. These passages 636 are isolated from one another and from gaps 632. Air moves through the shroud 620, past the blades 12, and it exits through the downstream opening 624 of the shroud 620.

The term "airflow" is used throughout this application to denote a fluid flow. Although the primary intent of invention is for the extraction of energy from wind, the principles and innovations may apply equally to the flow of other fluids such as flowing water. It is to be understood that the exemplary embodiments are merely illustrative of the present invention and that many variations of the above-described embodiments can be devised by one skilled in the art without departing from the scope of the invention.

The invention claimed is:

1. A wind turbine for extracting energy out of an airflow, the wind turbine having an axis of rotation, the wind turbine comprising:
    turbine blades mounted for axial rotation and having a swept area;
    a first shroud surrounding the turbine blades and defining a first axial air passage, the first shroud having an upstream opening and a downstream opening;
    a conical ring attached in the upstream opening, the conical ring having an upstream edge defining an upstream area, and a downstream edge defining a downstream area, the upstream area being larger than the downstream area;
    a plurality of vanes between the upstream area and the downstream area, the vanes generally perpendicular to the swept area of the blades;
    a plurality of plates attached to the first shroud, the plates spaced radially outward from the first shroud, the plates spaced around the circumference of the first shroud and projecting beyond the downstream opening of the first shroud, the plurality of plates forming a second discontinuous shroud; the first shroud and the plurality of plates forming a second axial air passage between the first shroud and plurality of plates;
    the plurality of plates having gaps between adjacent plates such that air exiting the downstream opening of the first shroud and air moving through the second axial air passage are mixed and a portion of the mixed air exits through the gaps.

2. The wind turbine of claim 1 wherein the ratio of the total area of the plates to the total area of the gaps is between 8:1 and 1:1

3. The wind turbine of claim 1 wherein the ratio of the total area of the plates to the total area of the gaps is approximately 3:1.

4. The wind turbine of claim 1 further including a ring mounted near the downstream end of the plates and spaced radially outward from the plates to create a third axial air passage between the ring and the plates.

5. The wind turbine of claim 4 wherein the ring is continuous.

6. The wind turbine of claim 4 wherein the ring is discontinuous.

7. The wind turbine of claim 1 wherein the plates extend from a location near the upstream opening of the shroud to a location beyond the downstream opening of the shroud.

8. The wind turbine of claim 1 wherein the plates extend from a location near the midpoint between the upstream opening of the shroud and the downstream opening of the shroud to a location beyond the downstream opening of the shroud.

9. The wind turbine of claim 1 wherein the plates are arcuate in shape.

10. The wind turbine of claim 1 wherein the plates have a curvature generally corresponding to the shroud.

11. The wind turbine of claim 1 wherein the first shroud is conical.

12. The wind turbine of claim 1 wherein the plates have a width which increases in the direction of the airflow.

13. The wind turbine of claim 1 wherein the number of blades is between 3 and 20.

14. The wind turbine of claim 1 wherein the vanes extend generally in the radial direction.

15. The wind turbine of claim 1 wherein the vanes extend in both the radial and circumferential direction.

16. A wind turbine for extracting energy out of an airflow, the wind turbine having an axis of rotation, the wind turbine comprising:
turbine blades mounted for axial rotation about a hub, the blades having a swept area;
a first cylindrical shroud surrounding the turbine blades and defining a first axial air passage, the first cylindrical shroud having an upstream opening and a downstream opening;
a conical ring attached in the upstream opening, the conical ring having an upstream edge defining an upstream area, and a downstream edge defining a downstream area, the upstream area being larger than the downstream area;
a plurality of vanes between the upstream area and the downstream area, the vanes generally perpendicular to the swept area of the blades;
a plurality of plates attached to the first cylindrical shroud, the plates spaced radially outward from the first cylindrical shroud, the plates spaced around the circumference of the first cylindrical shroud and projecting beyond the downstream opening of the first cylindrical shroud, the plurality of plates forming a second discontinuous shroud; the first cylindrical shroud and the plurality of plates forming a second axial air passage between the first cylindrical shroud and plurality of plates;
the plurality of plates having gaps between adjacent plates such that air exiting the downstream opening of the first cylindrical shroud and air moving through the second axial air passage are mixed and a portion of the mixed air exits through the gaps.

17. The wind turbine of claim 16 wherein the ratio of the total area of the plates to the total area of the gaps is between 8:1 and 1:1.

18. The wind turbine of claim 16 wherein the ratio of the total area of the plates to the total area of the gaps is approximately 3:1.

19. The wind turbine of claim 16 further including a ring near the downstream end of the plates and spaced radially outward from the plates to create a third axial air passage between the ring and the plates.

20. The wind turbine of claim 19 wherein the ring is continuous.

21. The wind turbine of claim 19 wherein the ring is discontinuous.

22. The wind turbine of claim 16 wherein the plates extend from a location near the upstream opening of the cylindrical shroud to a location beyond the downstream opening of the cylindrical shroud.

23. The wind turbine of claim 16 wherein the plates extend from a location near the midpoint between the upstream opening of the cylindrical shroud and the downstream opening of the cylindrical shroud to a location beyond the downstream opening of the cylindrical shroud.

24. The wind turbine of claim 16 wherein the plates are arcuate in shape.

25. The wind turbine of claim 16 wherein the plates have a curvature generally corresponding to the shroud.

26. The wind turbine of claim 16 wherein the plates have a width which increases in the direction of the airflow.

27. The wind turbine of claim 16 wherein the number of blades is between 3 and 20.

28. The wind turbine of claim 16 wherein the number of blades is 6.

29. The wind turbine of claim 16 wherein the plates are angled away from the axis of rotation at an angle of between 0 degrees and 40 degrees.

30. The wind turbine of claim 16 wherein the vanes extend generally in the radial direction.

31. The wind turbine of claim 16 wherein the vanes extend in both the radial and circumferential direction.

32. A wind turbine for extracting energy out of an airflow, the wind turbine having an axis of rotation, the wind turbine comprising:
turbine blades mounted for axial rotation, the blades having a swept area;
a first shroud surrounding the turbine blades and defining a first axial air passage, the first shroud having an upstream opening and a downstream opening;
a conical ring attached in the upstream opening, the conical ring having an upstream edge defining an upstream area, and a downstream edge defining a downstream area, the upstream area being larger than the downstream area;
a plurality of vanes between the upstream area and the downstream area, the vanes generally perpendicular to the swept area of the blades;
a plurality of plates attached to the first shroud, the plates spaced around the circumference of the first shroud and projecting beyond the downstream opening of the first shroud, the plurality of plates forming a second discontinuous shroud;
the plurality of plates having gaps between adjacent plates such that a portion of the air exiting the downstream opening of the first shroud exits through the gaps.

33. The wind turbine of claim 32 wherein the vanes extend generally in the radial direction.

34. The wind turbine of claim 32 wherein the vanes extend in both the radial and circumferential direction.

* * * * *